3,017,387
POLYEPOXY ETHERS OF POLYHYDRIC PHENOLS AND CURED PRODUCTS OBTAINED THEREFROM
Carl G. Schwarzer, Walnut Creek, and Paul H. Williams, Orinda, Calif., assignors to Shell Oil Company, a corporation of Delaware
No Drawing. Filed July 21, 1958, Ser. No. 749,639
8 Claims. (Cl. 260—47)

This invention relates to a new class of epoxy ethers and to their preparation. More particularly, the invention relates to new self-curing epoxy ethers of special polyhydric phenols prepared from hydroxy-substituted carbonylic compounds and to the utilization of these epoxy ethers, particularly in the preparation of rapid curing coating compositions.

Specifically, the invention provides new and particularly useful polyepoxy ethers comprising polyethers of epoxy-substituted monohydric alcohols and polyhydric polynuclear phenols obtained by condensing a phenol with a hydroxy-substituted carbonylic compound. The invention further provides new and particularly useful insoluble, infusible products obtained by curing the above-described polyepoxy, with or without curing agents, alone or in combination with other polyepoxides, such as glycidyl ether of 2,2-bis(4-hydroxyphenyl)propane.

Epoxy resins known theretofore have been largely polyglycidyl ethers of dihydric phenols, such as 2,2-bis-(4-hydroxyphenyl)propane. These resins are not self-curing and can be cured only with the help of curing agents, such as polyamines or polybasic anhydrides. In addition, the cure obtained in many cases is not rapid enough, particularly at temperatures below about 70° C. In addition, these resins have limited solubility in aqueous systems and require the use of rather expensive organic solvents. Further, the cured products obtained by these epoxy resins are hard and strong at normal temperatures, but the hardness and strength are sometimes lost at elevated temperatures. Consequently, the usual epoxy resins are not particularly suitable in applications where the cured product is subjected to elevated temperatures, such as in the case of adhesives and laminated products used in the preparation of jet aircraft, guided missiles and the like.

It is, therefore, an object of the invention to provide a new class of epoxy ethers. It is a further object to provide new epoxy ethers which are self-curing and can be cured by the mere application of heat. It is a further object to provide new epoxy ethers which are soluble in certain aqueous systems. It is a further object to provide new epoxy ethers which can be cured rapidly at low temperatures to form fast curing coatings. It is a further object to provide new epoxy ethers which can be cured to form products having excellent hardness at elevated temperatures. It is a further object to provide epoxy ethers which can be used to form coatings having good water resistance. These and other objects of the invention will be apparent from the following detailed description thereof.

It has now been discovered that these and other objects may be accomplished by the new polyepoxy polyethers of the invention which comprise polyethers of epoxy-substituted monohydric alcohols, such as, for example, glycidol, and polyhydric polynuclear phenols obtained by reacting a phenol with a hydroxy-substituted carbonylic compound. It has been found that these polyepoxy polyethers possess, particularly because of the presence of the aliphatic type hydroxy group located in a central position in relation to the phenolic groups, many unexpected and superior properties as compared to conventional polyepoxy ethers of dihydric phenols. It has been found, for example, that these special epoxy ethers are self-curing and can be converted to hard insoluble, infusible resins by the mere application of heat. It has also been found that these epoxy ethers when cured, particularly in the presence of polyamine curing agents, cure more rapidly as coatings in comparison to the conventional epoxy ethers. It has also been found that the new epoxy ethers have unexpected solubility in aqueous systems and can be utilized in the preparation of aqueous coating compositions. It has been found that the epoxy ethers can be cured in the presence of amines or anhydrides to form insoluble, infusible products having outstanding hardness at elevated temperatures. It has been found, for example, that products prepared by these special epoxy ethers have a heat distortion point which is about 50° C. higher than the produce prepared from the diglycidyl ether of bis-phenol-A.

The new polyepoxy ether of the invention are derived from polyhydric polynuclear phenols which are readily obtained by condensing a phenol with a hydoxy carbonylic compound. This condensation is effected by mixing the phenol and the hydroxy-substituted carbonylic compound together using a substantial excess of the phenol over the stoichiometric proportions of phenol required for reaction with the hydroxy-substituted carbonylic compound through the carbonylic group, introducing a small amount of hydrogen chloride, allowing the mixture to react for several days and removing the unreacted phenol, such as by distillation. Mercaptans such as ethyl mercaptan, may be added to the mixture to improve the yield.

The polyhydric phenol prepared from phenol and glyceraldehyde may be illustrated by the following:

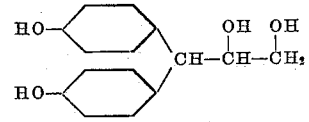

The phenols used in the condensation reaction may be monohydric or polyhydric and may be substituted with other substituents as halogen atoms, alkoxy radicals, hydrocarbyl radicals and the like. Examples of monohydric phenols that may be used in the above process include, among others, phenol, 3-chlorophenol, 3,5-dichlorophenol, 3-ethylphenol, 3,5 - diisopropylphenol, 3-methoxyphenol, 3-chloro-5-methoxyphenyl, ortho and meta-cresol, and the like. Particularly preferred are the monohydric phenols containing from 6 to 12 carbon atoms and containing elements of the group consisting of carbon, hydrogen, oxygen and chlorine.

Examples of polyhydric phenols that may be used in the preparation of the above-described polyhydric phenols include, among others, resorcinol, 2,2 - bis(4-hydroxyphenyl)propane, 2,2 - bis(4-hydroxyphenyl)butane, 1,4-dihydroxy-3-butylbenzene, -1,4-dihydroxy-3-tertiary-butylbenzene, catechol, hydroquinone, methyl resorcinol, 1,5-dihydroxynaphthalene, 4,4'-dihydroxybenzophenone, bis-(4-hydroxyphenyl)ethane and the like, and their chlorinated derivatives. Preferred polyhydric phenols to be employed are the di- and trihydric phenols substituted on single aromatic rings or rings that are joined together through an alkylene group, and containing no more than 25 carbon atoms, and preferably no more than 15 carbon atoms.

The hydroxy-substituted carbonylic compounds used in the condensation reaction to form the new polyhydric phenols are those aliphatic or cycloaliphatic compounds having at least one and preferably two or more hydroxy groups and at least one carbonyl group, that is a

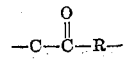

where R equals hydrogen or a hydrocarbon radical. Examples of these compounds include, among others, glyceraldehyde, 2,3 - dihydroxybutyraldehyde, 1,2 - dihydroxy-3-ketobutane, 2,3-dihydroxy-4-ketobutane and the like. Particularly preferred are the di- and trihydroxy-substituted aliphatic monoaldehydes and monoketones containing no more than 12 carbon atoms, and particularly those wherein the hydroxy groups are attached to adjacent carbon atoms. The preparation of the polyhydric phenol by the reaction of phenol with glyceraldehyde is illustrated below:

1,2-DIHYDROXY-3,3-BIS(HYDROXY-PHENYL)PROPANE 3.06 moles of glyceraldehyde as a 61.2% aqueous solution and 3.6 moles of phenol were introduced into a stirred glass kettle and warmed until a homogeneous solution was obtained. Contents were cooled to 30° C. Anhydrous gaseous HCl was bubbled into the solution for about 10 minutes whereupon the solution was allowed to stand for several days. The solution was then heated to 40–60° C. for about 5 hours. Excess phenol was then removed by distillation at 156° C. at 8 mm. The resulting bisphenol was a light colored hydroscopic solid having a Durrans softening point of 96° C. The resin was recovered in 92% yield and had the following analysis: C 68.8%, H 6.1% (6.15%), OH 1.36 eq./100 (1.54) and Cl .05%. Acidity .769 (calc. .77 eq./100 g.) mol. wt. 308 (calc. 260).

The epoxy-substituted alcohols, the novel ethers of which are provided by the present invention, comprise those monohydric alcohols possessing at least one epoxy group, i.e., a

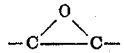

group. Examples of these alcohols include 2,3-epoxypropanol (glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-5-propanol, 2,3-dimethyl-4,5-epoxyoctanol, 2-methoxy - 4,5 - epoxyoctanol, 3,4-epoxy - 5 - chlorocyclohexanol, 2,3-epoxypropoxypropanol, 2,3-epoxypropoxypropanol, 2,3-epoxypropoxyhexanol, 2,3-epoxypropoxy-2,3-dihydroxyheptanol, 2,3-epoxydodecanol and 4-chloro-5,6-epoxydodecanol.

Preferred epoxy-substituted alcohols are the epoxy-substituted aliphatic and cycloaliphatic monohydric alcohols containing from 3 to 15 carbon atoms, such as 2,3-epoxypropanol, 3,4 - epoxybutanol, 3,4 - epoxydodecanol, 2-methyl-2,3-epoxypropanol, 2,3-epoxycyclohexanol, 2,3-epoxypropoxyethanol, 2,3-epoxypropoxyoctanol, and the like.

Particularly preferred epoxy-substituted alcohols are the epoxyalkanols, epoxyalkoxyalkanol, epoxycycloalkanols and epoxyalkoxycycloalkanols, and particularly those containing not more than 12 carbon atoms, such as 2,3-epoxypropanol, 3,4-epoxyhexanol, 2,3-epoxypropoxyoctanol, 2,3-epoxy-5-octanol, 2,3-epoxy-6-dodecanol, 2,3-epoxypropoxy - 5 - octenol, 3,4 - epoxycyclohexanol, 2,3-epoxypropoxy-4-cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the ease of preparation of their ethers as well as the superior properties possessed by such ethers.

The ethers may be obtained by various methods. The epoxy ethers of the above-described polyhydric phenols are preferably obtained by reacting the phenol with an epoxy-halo-substituted alkane or a dihalohydroxy-substituted alkane in an alkaline medium.

The expression "halo-epoxy-substituted alkanes" as used herein refers to those alkanes having a 1,2-epoxy group, i.e., a

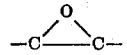

group attached directly to a halogen-bearing carbon atom, such as, for example, epichlorohydrin, epibromohydrin, 1,4-dichloro-2,3-epoxybutane, 1-chloro-2,3-epoxypentane, and the like. The expression "dihalo-hydroxy-substituted alkanes," as used herein, refers to those alkanes having a series of three carbon atoms, one of which is attached to a halogen atom, the next is attached to a hydroxyl group and the last is attached to a halogen atom, such as, for example, 1,3-dichloro-2-hydroxypropane, 2,4-dibromo-3-hydroxypentane, 2,3-dichloro-3-hydroxybutane, and the like. Epichlorohydrin comes under special consideration because of its low cost and because of the superior properties of the epoxides obtained therefrom.

The polyglycidyl ethers of the invention may be prepared by adding the polyphenol to epichlorohydrin using the latter in a ratio of about 2 to 10 molecules of epichlorohydrin per phenolic hydroxyl group of the phenol, and then adding an alkali metal hydroxide such as sodium or potassium hydroxide so as to effect the desired etherification reaction. It is convenient to dissolve the polyphenol in the substantial stoichiometric excess of epichlorohydrin and heat the mixture to about reflux temperature. Aqueous sodium hydroxide, such as about a 15% to 50% solution, is then added gradually with boiling of the reaction mixture. The water added with the caustic and formed in the reaction is removed by distillation azeotropically with epichlorohydrin. Condensed distillate separates into an upper aqueous phase and a lower epichlorohydrin phase, which latter phase is returned as reflux. It is desirable to add the caustic and conduct the distillation at rates so that the reaction mixture contains at least about 0.5% water in order to have the etherification reactions progress at a reasonably rapid rate. The sodium hydroxide is added in amount that is equivalent on stoichiometric basis to the quantity of starting phenol, or a small excess thereof such as 3% to 5%. Upon completion of the caustic addition and the etherification reactions, unreacted epichlorohydrin is separated by distillation. The residue consisting primarily of the polyglycidyl ether and salt has added thereto a mixture of equal volumes of toluene and butanone. This solvent mixture dissolves the ether, but not the salt which is removed by filtration. The filtrate is then distilled to separate the solvent and leave the desired polyglycidyl ether.

The polyepoxy ethers of the present invention are generally solid resins at 25° C. and have more than one of the hydrogen atoms of the phenolic hydroxy groups of the polyhydric phenol replaced by an epoxy-substituted radical in the average molecule. The new resins also have free aliphatic hydroxy groups which are not part of chlorohydrin groups and as such bestow different properties to the resulting epoxy ethers. The new polyepoxy ethers, for example, are soluble in aqueous systems, and particularly systems such as water, alcohol, ketones and the like. The new epoxy ethers are also soluble in hydrocarbon solvents, such as xylene, toluene and the like.

As stated hereinbefore, the new epoxy ethers are unique in that they are self-curing and can be converted to resins by the application of heat. The new epoxy ethers may also be polymerized through the epoxy group by further reaction with conventional epoxy curing agents. In this capacity, they may be polymerized alone or with other polyepoxide materials in a variety of different proportions, such as, for example, with amounts of other polyepoxides varying from 5% to 98% by weight. Polyepoxides that may be copolymerized with these new polyepoxides include, among others, glycidyl polyethers of polyhydric phenols obtained by reacting polyhydric phenols, such as bis-phenol, resorcinol, and the like, with an excess of chlorohydrin such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyethers of polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and copolymerization. Such agents include, among others, carboxylic acids or anhydrides, such as oxalic acid, phthalic anhydride; Friedel-Crafts metal halides, such as aluminum chloride, zinc chloride, ferric chloride, or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetramine, dicyandiamide, melamine; and salts of inorganic acids, such as zinc fluoborate, potassium persulfate, nickel fluoborate, copper fluoborate, sellenium fluoborate, magnesium fluoborate, tin fluoborate, potassium magnesium arsenate, magnesium sulfate, cadmium arsenate, cadmium silicate, aluminum fluoborate, ferrous sulfate, ferrous silicate, manganese hypophosphite, nickel phosphate and nickel chlorate.

The amount of the curing agents employed may vary over a considerable range depending up the agent selected. With curing agents having replaceable hydrogen, such as the amine agents, amounts of agent employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the material being polymerized. With the phosphoric acid and esters, particularly preferred amounts vary from about 3% to 20% by weight. The other curing agents are preferably employed in amounts varying from 1% to 20%.

The new epoxy ethers are particularly suited for use in making coating compositions as they can be cured or dried at a faster rate, particularly at lower temperatures as below about 40° C. than conventional epoxy resins. They are also particularly suited for such applications in that they have surprising solubility in aqueous systems, such as mixtures of water and alcohol and can be used to make water base primers and the like.

The new epoxy ethers are also particularly useful in preparing high temperature adhesives, laminates or castings because of their outstanding heat resistance. In these applications, the resins are preferably mixed with a suitable curing agent as described above and any desired solvent or diluent and then used in the desired application. Cure of the resin is preferably accelerated by the application of heat, such as temperatures ranging from 100° to 200° C.

In using the new epoxy ethers in various applications, it is, in many cases, desirable to mix the resin with other materials, such as fillers, reactive diluents, pigments, plasticizers and other resins such as phenolic resins, urea and melamine resins, polysulfide resins, polyvinyl resins and the like.

The epoxy ethers of the invention may also be further reacted with acids and particularly drying oil acids, to form valuable materials for use in making coating compositions. Because of the aliphatic hydroxy groups in the phenol portion of the ethers, additional drying oil acids may be introduced per weight of the ether, and the product will thus have better drying properties.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

*Example I*

This example illustrates the preparation and some of the properties of a polyglycidyl ether of 1,2-dihydroxy-3,3-bis(hydroxyphenyl)propane.

1,2-dihydroxy-3,3-bis(hydroxyphenyl)propane is dissolved in 7:1 molar excess of epichlorohydrin and about 2.3% by weight of water is added. This solution is heated vigorously with stirring and the kettle temperature is adjusted to 100° C. at total reflux by adding additional water. After the kettle temperature has been adjusted, 2% molar excess of sodium hydroxide based upon the bisphenol is added as a 46% by weight equivalent solution. A caustic solution is added over a 1.5 hour period. During this period, the kettle temperature is maintained at 100° C., by removing water periodically. The system is azeotroped to dryness after all the caustic solution has been added. The solution is filtered to remove salt formed during the reaction and the filtrate is distilled to remove the excess epichlorohydrin. This distillation is taken to a kettle temperature of 150° C. to 170° C. at 1–2 millimeters to insure complete removal of epichlorohydrin and other valuable products. The resulting product is a white brittle solid having an epoxy value of 0.408 eq./100 g., hydroxy value of 0.46 eq./100 g. and chlorine value of 0.45%, and Durrans softening point of 64° C.

100 parts of the above-described glycidyl ether was heated in an oil bath at 150° C. for 6 hours. At that time, the mixture had set up to form a hard resin. In a similar case, no cure was obtained with the glycidyl ether of bisphenol-A.

100 parts of the above-described glycidyl ether was mixed with an equivalent amount of diethylene triamine and the mixture heated at 125° C. for several hours. The resulting product had a heat distortion point of 200° C. A casting prepared in a similar monomer from the glycidyl ether of 2,2-bis(4-hydroxyphenyl)propane had a heat distortion point of only 148° C.

*Example II*

100 parts of the glycidyl ether prepared in Example I was added to a 50/50 mixture of alcohol and water. 25 parts of a curing agent prepared by condensing the glycidyl ether of 2,2-bis(4-hydroxyphenyl)propane with diethylene triamine as described in U.S. 2,651,589 was added thereto and the mixture spread on tin panels and cured. Resulting coating was hard and insoluble to water and solvents. In a similar experiment, the glycidyl ether of bisphenol-A was found to be incompatible with the 50/50 mixture.

*Example III*

A glass cloth laminate was prepared using the polyglycidyl ether prepared in Example I. An acetone solution containing 60% by weight of the polyglycidyl ether was prepared. A catalyst solution prepared by dissolving 13.5 parts of 2,6-diaminopyridine in 33.3 parts of water and 50 parts of acetone was added to the ether solution so that there was present an added 13.5 parts of the curing agent based upon the ether. A strip of 181 Volan A glass cloth was passed through the solution and dried for 10 minutes at about 90° C. The strip was cut in pieces and 6 plies were stacked together. The assembly was incased in cellophane and placed in a heated press having a temperature of about 175° C. The press platens were brought into contact pressure at about 3 p.s.i. for 1 minute and then the pressure was increased to 25 p.s.i. for 9 minutes. The product was a strong laminate having good heat resistance.

*Example IV*

The polyglycidyl ether of 1,2-dihydroxy-3,3-bis(hydroxyphenyl) butane is prepared by the same procedure as outlined in Example I. The resulting product is a light colored solid having an epoxy value of about 0.4 eq./100 g. This ether can be self-cured by heating at 150° C. to form a hard solid coating.

A glass cloth laminate is prepared as described in Example III, except that the polyglycidyl ether was replaced with the glycidyl ether from 1,2-dihydroxy-3,3-bis(hydroxyphenyl)butane. The resulting laminate retained excellent hardness, elevated temperatures and had good resistance to acetone.

*Example V*

This example illustrates the preparation and some of the properties of a polyglycidyl ether of a 1,2-dihydroxy-3,3-bis(hydroxyphenyl)hexane (prepared from 1,2-dihydroxy-3-ketohexane and phenol).

The above-described polyhydric phenol is dissolved in a 14:1 molar excess of epichlorohydrin and about 2.3% by weight of water was added. The solution is heated vigorously with stirring and the kettle temperature is adjusted to 100° C. at total reflux by adding additional water. After the kettle temperature has been adjusted, 2% molar excess of sodium hydroxide based upon the polyhydric phenol is added as a 46% aqueous solution. The caustic solution is added over a 2 hour period. During this period, the kettle temperature is maintained at 100° C. by removing water periodically. The system is azeotroped to dryness as all the caustic solution has been added. The solution is filtered to remove salt from it during the reaction and the filtrate is distilled to remove the excess epichlorohydrin and other volatile products. The resulting product is a white crystalline product. This resin can be self-cured by heating at 150° C.

100 parts of the above-described polyglycidyl ether is combined with 20 parts of 2,6 diaminopyridine and the mixture heated at 160° C. The resulting product is a hard, tough casting having good heat resistance and good resistance to acetone.

*Example VI*

The polyglycidyl ether of 1,2-dihydroxy-4,4-bis(hydroxyphenyl)pentane is prepared by the same procedure as outlined in Example I with the exception that the phenol reactant is replaced by 1,2-dihydroxy-4,4-bis(hydroxyphenyl)pentane obtained by condensing phenol with 1,2-dihydroxy-4-ketopentane. The resulting product is a light colored solid which can be self-cured to form a hard solvent resistant casting.

*Example VII*

Resins having related properties are obtained by replacing the polyhydric phenol in Example I with a polyhydric phenol obtained by condensing glyceraldehyde with resorcinol.

*Example VIII*

Resins having related properties are obtained by replacing the polyhydric phenol in Example I with a polyhydric phenol obtained by condensing glyceraldehyde with ortho cresol.

*Example IX*

A series of experiments are accomplished wherein 100 parts of the resins shown in Examples I, IV, V and VI are combined with 100 parts of each of the following polyepoxides and with a chemical equivalent amount of meta-phenylene diamine curing agent and heating at 120° C.: diglycidyl ether of 2,2-bis(4-hydroxyphenyl)propane, diglycidyl ester of dimerized fatty acids, diglycidyl ester of isophthalic acid, epoxidized soybean oil, vinyl cyclohexene diepoxide and the polyglycidyl ether of 1,1,2,2-tetrakis(hydroxyphenyl)ethane. In each case, the resulting product was a hard, heat resistant casting.

*Example X*

About 100 parts of the glycidyl ether prepared as in Example I was dissolved in xylene and 70% of the equivalent amount of soybean oil fatty acid added thereto. The resulting mixture was heated under a blanket of nitrogen until the acid number had been reduced to about 10. The resulting xylene solution was then spread out on tin panels and allowed to air dry. The resulting coating is a hard flexible coating having good solvent resistance.

*Example XI*

A series of experiments are accomplished wherein 100 parts of the resins shown in Examples I, IV, V and VI are combined with a chemical equivalent amount of hexahydrophthalic anhydride and heating at 120° C. The resulting products are hard solvent resistant castings.

We claim as our inventon:

1. An ether of a vic-epoxy substituted monohydric alcohol containing from 3 to 15 carbon atoms and a dihydroxyphenylalkanediol having both phenol group substituents attached to the same carbon atom, said dihydroxyphenyl alkanediol being the condensation product of a phenol with a dihydroxyl substituted carbonylic compound selected from the group consisting of aliphatic dihydroxymonoaldehydes and aliphatic dihydroxymonoketones containing no more than twelve carbon atoms per molecule, said ether having more than one of the hydrogen atoms of the phenolic hydroxyl groups of said dihydroxyphenylalkanediol replaced by an epoxy-substituted radical in the average molecule and containing both aliphatic hydroxyl groups originally present in said dihydroxyphenylalkanediol, said ether being characterized by its ability to cure to a hard resin by application of heat in the absence of added curing agent.

2. An insoluble, infusible product obtained by heating the polyglycidyl ether of claim 1 with a polyamine.

3. A polyglycidyl ether of 1,2-dihydroxy-3,3-bis(hydroxyaryl)propane wherein more than one of the hydrogen atoms of the phenolic hydroxyl groups of the 1,2-dihydroxy-3,3-bis(hydroxyaryl)propane have been replaced by glycidyl radicals, and wherein the aliphatic hydroxyl groups originally present on the 1,2-dihydroxy-3,3-bis(hydroxyaryl)propane remain as unreacted OH groups in the ether molecule.

4. A polyglycidyl ether of 1,2-dihydroxy-3,3-bis(4-hydroxyphenyl)propane wherein more than one of the hydrogen atoms of the phenolic OH groups of the 1,2-dihydroxy-3,3-bis(4-hydroxyphenyl)propane have been replaced by glycidyl radicals, and wherein the aliphatic hydroxyl groups originally present in the 1,2-dihydroxy-3,3-bis(4-hydroxyphenyl)propane remain as unreacted OH groups in the ether molecule.

5. A cured insoluble, infusible product obtained by heating the polyglycidyl ether of claim 4 with a polybasic acid anhydride.

6. A polyglycidyl ether of 1,2-dihydroxy-3,3-bis(dihydroxyphenyl)propane wherein more than one of the hydrogen atoms of the phenolic OH groups of the 1,2-dihydroxy-3,3-bis(dihydroxyphenyl)propane have been replaced by glycidyl radicals, and wherein the aliphatic hydroxyl groups originally present in the 1,2-dihydroxy-3,3-bis(dihydroxyphenyl)propane remain as unreacted OH groups in the ether molecule.

7. A polyglycidyl ether of 1,2-dihydroxy-4,4-bis(4-hydroxyphenyl)pentane wherein more than one of the hydrogen atoms of the phenolic OH groups of the 1,2-dihydroxy-4,4-bis(4-hydroxyphenyl)pentane have been replaced by glycidyl radicals, and wherein the aliphatic hydroxyl groups originally present in the 1,2-dihydroxy-4,4-bis(4-hydroxyphenyl)pentane remain as unreacted OH groups remaining in the ether molecule.

8. A polyglycidyl ether of 1,2-dihydroxy-4,4-bis(4-hydroxyphenyl)butane wherein more than one of the hydrogen atoms of the phenolic OH groups of the said 1,2-dihydroxy-4,4-bis(4-hydroxyphenyl)butane have been replaced by glycidyl radicals, and wherein the aliphatic hydroxyl groups originally present in the 1,2-dihydroxy-4,4-bis(4-hydroxyphenyl)butane remain as unreacted OH groups in the ether molecule.

References Cited in the file of this patent

UNITED STATES PATENTS

| | | |
|---|---|---|
| 1,539,517 | Schmidt | May 26, 1925 |
| 2,252,725 | Niederl | Aug. 19, 1941 |
| 2,615,007 | Greenlee | Oct. 21, 1952 |
| 2,798,079 | Linn | July 2, 1957 |
| 2,829,175 | Bowman et al. | Apr. 1, 1958 |

OTHER REFERENCES

Schwarzer et al.: German application Ser. No. N11395 (Kl.39c2), printed Aug. 2, 1956.